United States Patent [19]

Dunchock

[11] Patent Number: 5,150,406
[45] Date of Patent: * Sep. 22, 1992

[54] AUTOMOTIVE TELEPHONE SUPPORT

[76] Inventor: Richard Dunchock, 535 S. Coast Hwy., Unit 59, Laguna Beach, Calif. 92651

[ * ] Notice: The portion of the term of this patent subsequent to Jul. 14, 2009 has been disclaimed.

[21] Appl. No.: 788,802

[22] Filed: Nov. 7, 1991

Related U.S. Application Data

[63] Continuation-in-part of Ser. No. 724,586, Jul. 1, 1991, Pat. No. 5,131,036.

[51] Int. Cl.$^5$ .................. H04M 1/00; B60R 7/00; A47B 96/06
[52] U.S. Cl. .................. 379/446; 379/454; 379/455; 224/42.42; 248/222.2
[58] Field of Search .............. 379/454, 446, 447, 449, 379/450, 455, 457; 224/273, 42.42, 42.45 R, 42.43; 248/309.1, 222.2, 231.8, 214, 301; 381/86, 87

[56] References Cited

U.S. PATENT DOCUMENTS

| | | |
|---|---|---|
| 2,522,477 | 9/1950 | Wexberg et al. ............ 224/42.45 R |
| 3,344,236 | 9/1967 | Chipping . |
| 4,061,971 | 12/1977 | Barrons . |
| 4,196,319 | 4/1980 | Gates . |
| 4,432,522 | 2/1984 | Pruente et al. ........................ 379/454 |
| 4,611,734 | 9/1986 | Luecking et al. . |
| 4,640,542 | 2/1987 | Watjer et al. . |
| 4,842,174 | 6/1989 | Sheppard et al. . |
| 4,858,796 | 8/1989 | Roth ................................. 224/42.44 |
| 4,945,561 | 7/1991 | Rioux, Jr. ........................... 379/454 |
| 5,048,083 | 9/1991 | Dunchock ........................... 379/455 |

FOREIGN PATENT DOCUMENTS 2581605  11/1986  France .

Primary Examiner—James L. Dwyer
Assistant Examiner—Jack Chiang
Attorney, Agent, or Firm—Stetina and Brunda

[57] ABSTRACT

A telephone supporting device is disclosed which is detachably mountable to an automobile center console. The device comprises a coupling member which is releasably secured to the console and a housing sized and configured to be secured upon the console in detachable engagement with the coupling member.

12 Claims, 2 Drawing Sheets

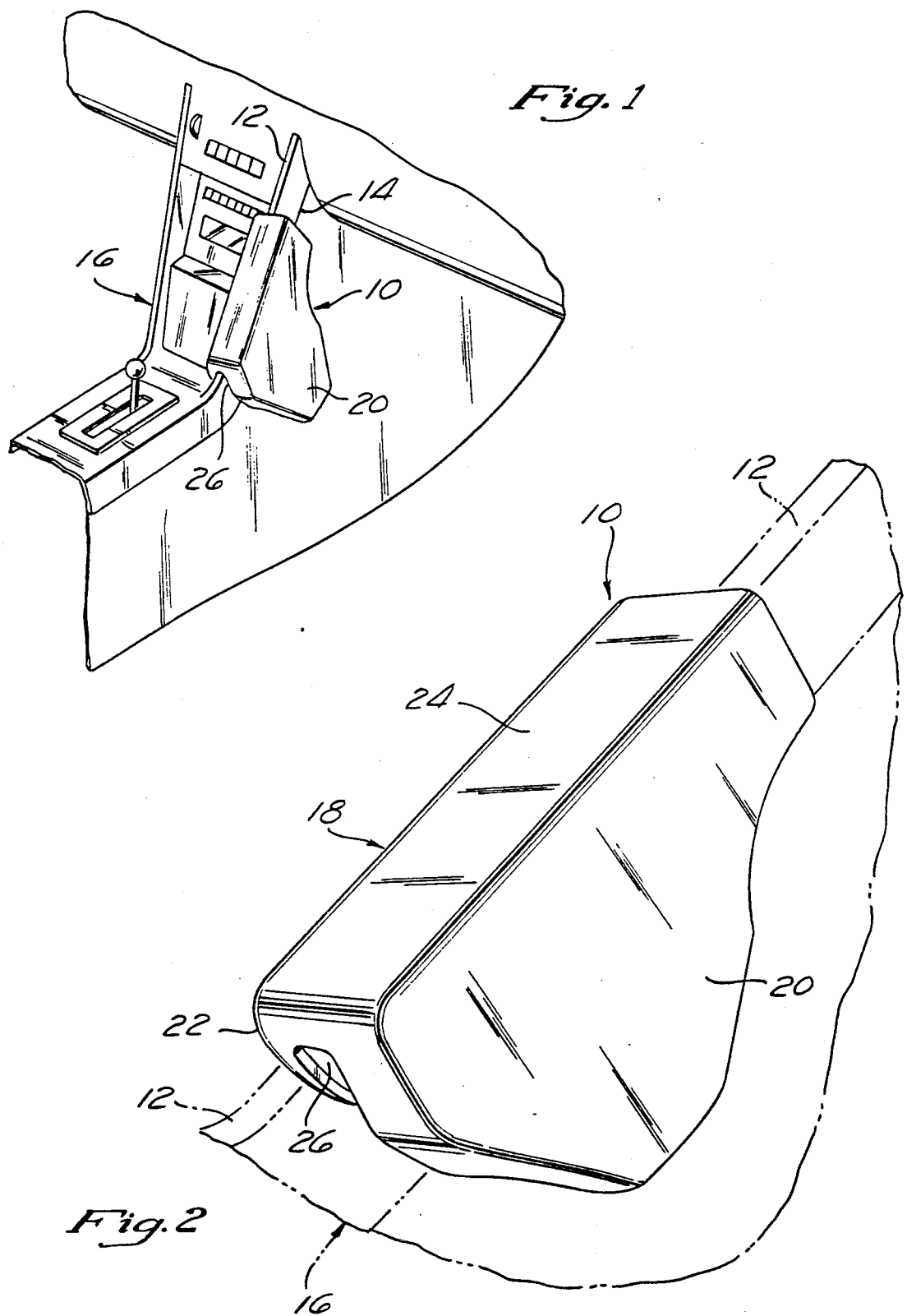

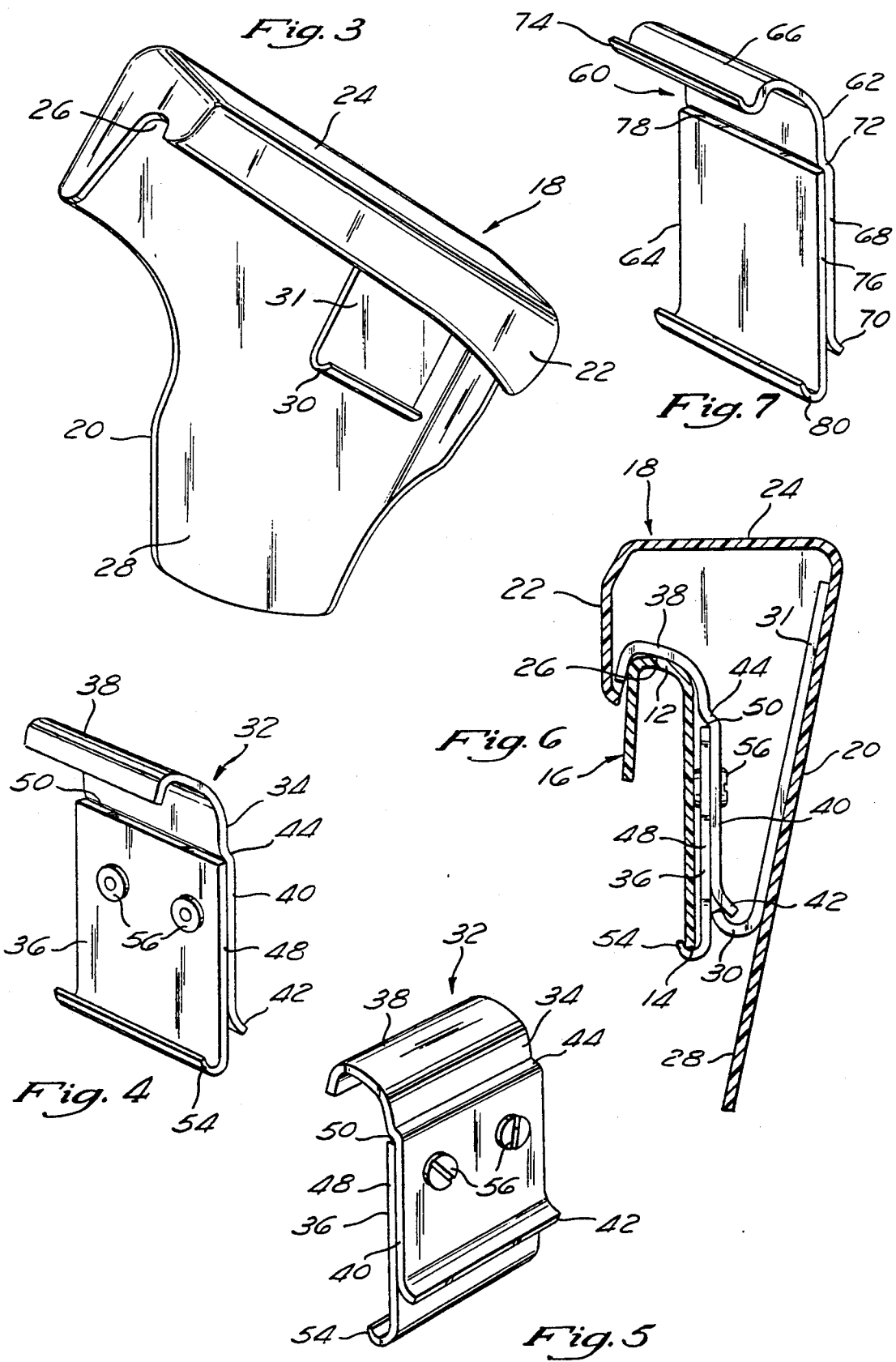

AUTOMOTIVE TELEPHONE SUPPORT

FIELD OF THE INVENTION

The present application is a continuation-in-part of application Ser. No. 07/724,586 filed Jul. 1, 1991 U.S. Pat. No 5,131,036.

The present invention pertains generally to the art of automotive accessories, and more particularly to a device for mounting cellular telephones and similar accessories adjacent to the center console (i.e., an elongate console positioned between the two front seats) of an automobile.

BACKGROUND OF THE INVENTION

It has heretofore been a common practice in the art to mount cellular telephones and similar accessories directly on accessible areas of an automobile instrument panel and/or a center console (i.e., the console positioned between the driver's seat and the front passenger seat of the automobile). Recent trends in automotive designs have, however, resulted in a diminution of available mounting space for cellular telephones and available accessories.

In efforts to create more space for mounting telephones and/or other accessories, some installers have used mounting brackets for attaching telephone and/or other accessories to the side of the automobile center console. Such mounting brackets are typically attached to the center console by way of screws or bolts. Thus, if it is subsequently desired to remove the telephone or other accessory, extraction of the screws or bolts leaves unsightly holes in visible portions of the center console.

The Applicant has previously disclosed a device for mounting cellular telephones adjacent to the center console without the need to insert screws or bolts into the console. In Applicant's prior invention, disclosed in U.S. patent application Ser. No. 07/470,723, filed Jan. 26, 1990, and entitled "Automotive Telephone Mounting Device", Applicant has disclosed a device that retractably engages the finished portion of the console without requiring unsightly holes in visible portions of the console. The device is secured to the console by means of screws extending through the underlying center hump through the carpet. Thus, removal of the telephone supporting device does not result in any unsightly holes in the finished portion of the console, leaving only a hole in the floor board hump which is typically unobservable through the carpet nap.

Accordingly, Applicant's prior device satisfies the need for a telephone supporting device which can be removed without leaving any visible damage in the center console. However, many car owners prefer that the telephone supporting device be removable without leaving any screw holes, even in the underlying floor board hump. In response to this particular need, Applicant has also previously disclosed a device for mounting cellular telephones adjacent to the center console without the need to insert screws or bolts to the underlying floor board hump. In this prior invention of Applicant, disclosed in U.S. patent application Ser. No. 07/724,586, filed Jul. 1, 1991 and entitled Telephone Supporting Device, Applicant has disclosed a device that engages the finished portion of the console without requiring holes in the underlying floor board hump. The device comprises a coupling member adhesively secured to the console and a housing sized and configured to be secured upon the console and in detachable engagement with the coupling member. Thus, installation of the telephone supporting device to the console does not require the utilization of any screws or bolts since the supporting device is affixed to the console via the utilization of an adhesive.

Though this particular prior device of Applicant satisfies need for a telephone supporting device which can be removed without leaving any visible damage to the center console and without leaving any screw holes in the underlying floor board hump, there still exists the need for removing the adhesive applied to the visible surfaces of the console. This particular procedure is often times difficult and time-consuming and generally requires the use of certain types of chemicals to facilitate the removal of the adhesive. Applicant's present invention is designed to provide a telephone supporting device which can be secured and removed without the need for any screws or bolts and without the need for any adhesives, while being effective to securely engage the telephone supporting device to the center console.

SUMMARY OF THE INVENTION

A telephone supporting device as disclosed which is detachably mountable to an automobile center console. The device comprises a coupling member releasably secured to the console and a housing sized and configured to be secured upon the console in detachable engagement with the coupling member.

In the presently preferred embodiment, the coupling member has an upper flange which is formed to receive a raised upper edge portion of the console. The coupling member is also provided with a body portion extending substantially downwardly along an exterior side portion of the console and a first lower flange extending outwardly from the body portion in a direction away from the exterior side portion of the console. The coupling member further includes a second lower flange which is formed to receive a lower edge portion of the console. In a first embodiment, the coupling member comprises a first member which includes the upper flange, the lower flange, and a first substantially planar body portion. A second member which includes the second lower flange as well as a second substantially planar body portion is releasably connected to the first member. When the first and second members are connected, the first and second body portions are in abutting contact. The first body portion of the first member further includes a first pair of apertures disposed therein while the second body portion of the second member includes a second pair of apertures disposed therein in an orientation wherein the first and second pairs are coaxially alignable when the first body portion is abutted against the second body portion. The coaxially aligned pairs of apertures are sized to receive a pair of fastener members which are operable to secure the coupling member to the console when tightened. In accordance with a second embodiment, the first and second coupling members are connected to one another via an adhesive and do not include the coaxially aligned pairs of apertures and fastener members. Additionally, the upper flange includes an upwardly turned lip formed along the distal edge thereof to aid in the interface of the housing thereto. The coupling member constructed in accordance with the second embodiment possesses sufficient resiliency so as to be releasably securable to the console.

The housing is preferably sized and configured to mount upon the console raised upper edge portion. Additionally, the housing preferably includes a lip formed on an inner surface thereof for detachable engagement to the coupling member first lower flange and an upper surface to which the telephone may be secured. The housing is also provided with first and second sidewall portions. A channel is formed intermediate the first and second sidewall portions for receiving the console raised upper edge portion in a manner where the sidewall portions extend about the raised upper edge portion. The housing sidewall portions are normally biased towards each other to oppose lateral movement of the housing. The engagement of the housing lip to the coupling member first lower flange further opposes vertical movement of the housing with respect to the console.

BRIEF DESCRIPTION OF THE DRAWINGS

These as well as other features of the present invention will become more apparent upon reference to the drawings wherein:

FIG. 1 is a perspective view of an automobile center console illustrating the telephone supporting device thereon;

FIG. 2 is a front perspective view of an automotive telephone supporting device formed in accordance with the present invention;

FIG. 3 is a rear perspective view of the device shown in FIG. 2;

FIG. 4 is a rear perspective view of a coupling member used in securing the telephone supporting device to the center console;

FIG. 5 is a front perspective view of the coupling member used in securing the telephone supporting device to the center console;

FIG. 6 is a sectional view showing the telephone supporting device mounted on the console upper edge portion; and FIG. 7 is a rear perspective view of a second embodiment of the coupling member used in securing the telephone supporting device to the center console.

DETAILED DESCRIPTION OF THE PREFERRED EMBODIMENT

The detailed description set forth below in connection with the appended drawings is intended merely as a description of the presently preferred embodiments of the invention, and is not intended to represent the only form in which the present invention may be constructed or utilized. The description sets forth the functions and sequence of steps for construction and implementation of the invention in connection with the illustrated embodiments. It is to be understood, however, that the same or equivalent functions and sequences may be accomplished by different embodiments that are also intended to be encompassed within the spirit and scope of the invention.

FIG. 1 is a perspective view of an automobile center console illustrating a telephone supporting device mounted thereon. As shown in FIG. 1, telephone supporting device 10 is secured to a raised upper edge portion 12 and a lower edge portion 14 of an automobile console 16. It will be understood by those skilled in the art that the precise configuration and orientation of the device 10 will vary in accordance with the size and shape of the console to which it is to be mounted. For example, the upper edge portion 12 and lower edge portion 14 of the console 16 may be formed at different angles or having different vertical clearances in relation to the flat portions of the console. Thus, the length and shape of the telephone supporting device 10 will vary in order to accommodate the available clearances and configurations of the console edge portions 12 and 14.

FIG. 2 is a front perspective view of a housing 18 of the telephone supporting device 10 shown in FIG. 1. As shown in FIG. 2, the housing 18 includes an exterior side portion 20, an interior side portion 22, and an upper surface 24 for supporting a telephone (not shown). A channel 26 is formed intermediate the vertical side portions 20 and 22 for receiving the console raised upper edge portion 12 (see FIG. 1). Side portions 20 and 22 are normally biased towards each other to oppose lateral movement of the telephone supporting device 10 with respect to the console 16. It should be understood that the size and shape of channel 26 is formed in accordance with the particular size and shape of the console raised upper edge portion 12 to further oppose lateral motion of the telephone supporting device 10 with respect to the console 16.

FIG. 3 is a rear perspective view of the housing 18 shown in FIG. 2. FIG. 3 further illustrates the inner surface 28 of exterior side portion 20. As shown therein, a lip 30 is included on the inner surface 28 for detachable engagement to a coupling member 32, as described more fully below. In the preferred embodiment, lip 30 is formed upon an engagement member 31 which is rigidly attached to inner surface 28 via an adhesive. Though lip 30 is shown as being formed upon engagement member 31, it will be recognized that lip 30 may be formed directly upon inner surface 28. The coupling member 32 is preferably secured to the upper edge portion 12 and lower edge portion 14 of the console 16. The housing 18 is secured to the console 16 by means of both engagement of the console upper edge portion 12 within the housing channel 26, and by engagement of the coupling member 32 to the lip 30. The present invention therefore avoids the need for any screws or other destructive fasteners to secure the housing 18 or coupling member 32 to the center console 16.

FIGS. 4 and 5 illustrate a first embodiment of the coupling member 32 used with the mounting device 10 of the present invention. Coupling member 32 comprises a first member 34 having a second member 36 releasably connected thereto. First member 34 includes an upper flange 38, a first body portion 40 having a substantially planar configuration, and a first lower flange 42 extending outwardly from the first body portion 40. First member 34 further includes a stepped portion 44 formed between the first body portion 40 and the upper flange 38 as well as a first pair of apertures disposed within the first body portion 40. In the first embodiment, upper flange 38 is sized and configured to receive the raised upper edge portion 12 of console 16. Second member 36 includes a second substantially planar body portion 48 defining an upper edge 50 and including a second pair of apertures disposed therein. Second member 36 further includes a second lower flange 54 which is sized and configured to receive the lower edge portion 14.

In the first embodiment, second member 36 is interfaced to first member 34 via the abutment of second body portion 48 against first body portion 40 in a manner wherein upper edge 50 is directly abutted against stepped portion 44. Importantly, second member 36 is oriented such that the second lower flange 54 extends in the same direction as the upper flange 38. Importantly, when upper edge 50 is abutted against the stepped portion 44, the first pair of apertures within first member 34 will be coaxially aligned with the second pair of apertures within second member 36. A pair of fastener members 56 are received into the coaxially aligned apertures and are operable to secure the first member 34 to the second member 36.

Having thus described the components comprising the coupling member 32, the manner in which it is interfaced to the console 16 will now be described. Prior to attachment to console 16, first member 34 and second member 36 are in a separated configuration. Second member 36 is initially oriented upon the console 16 such that the lower edge portion 14 is received into the second lower flange 54. As will be recognized, when lower edge portion 14 is received into second lower flange 54, the second body portion 48 of second member 36 extends substantially upwardly along an exterior side portion 58 of the console 16. First member 34 is the interfaced to the console 16 such that the raised upper edge portion 12 is received into the upper flange 38. Additionally, first member 34 is oriented such that the upper edge 50 of second member 36 is abutted against the stepped portion 44 and the first body portion 40 is abutted against the second body portion 48. Importantly, due to the sizing of coupling member 32 relative the distance separating upper edge portion 12 and lower edge portion 14, for upper edge 50 to be forced against stepped portion 44, upper flange 38 and second lower flange 54 must be pressed toward each other. Once the first and second pairs of apertures have been coaxially aligned, the fastener members 56 are inserted thereinto and tightened. Since the upper flange 38 and second lower flange 54 are forced toward each other during the alignment of the aperture pairs, the coupling member 32 is rigidly secured to the console 16. As can be appreciated, the first member 34 and second member 36 must be sized and configured so as to require that the upper flange 38 and second lower flange 54 be pushed toward each other to align the apertures 46 and 52. As will be further understood by those of ordinary skill in the art, the particular size and shape of the coupling member 32 is selected in accordance with the particular configuration of the console on which the telephone supporting device is to be mounted.

Referring now to FIG. 7, disclosed is a coupling member 60 constructed in accordance with a second embodiment of the present invention. Coupling member 60 comprises a first member 62 having a second member 64 rigidly connected thereto. First member 62 includes an upper flange 66, a first body portion 68 having a substantially planar configuration, and a first lower flange 70 extending outwardly from the first body portion 68. First member 62 further includes a stepped portion 72 formed between a first body portion 68 and the upper flange 66 as well as an upwardly turned lip 74 formed along the distal edge of the upper flange 66. In the second embodiment, upper flange 66 is sized and configured to receive the raised upper edge portion 12 of console 16. Second member 64 includes a second substantially planar body portion 76 defining an upper edge 78 and a second lower flange 80 which is sized and configured to receive the loweredge portion 14.

In the second embodiment, second member 64 is interfaced to first member 62 via an adhesive wherein second body portion 76 is abutted against and adhesively secured the first body portion 68 in a manner wherein upper edge 78 is directly abutted against stepped portion 72. Importantly, when secured to first member 62, second member 64 is oriented such that the second lower flange 80 extends in the safe direction as upper flange 66.

In the second embodiment, coupling member 60 is formed from materials so as to possess sufficient resiliency to allow coupling member 60 to be interfaced to the console 16. In this respect, in attaching the coupling member 60 to the console 16, the member 60 is bent rearwardly, i.e. in the safe direction as the first lower flange 70, and oriented upon the console 16 such that the lower edge portion 14 is received into the second lower flange 54, the second body portion 76 extends substantially upwardly along an exterior side portion 58 of the console 16, and the raised upper edge portion 12 is received into the upper flange 66. Importantly, due to the sizing of the coupling member 60 relative the distance separating upper edge portion 12 and lower edge portion 14, once the rearward bending force is removed, the resiliency of the coupling member 60 will cause the member 60 to be rigidly secured to the console 16. Advantageously, the upwardly turned lip 74 formed along the distal edge of the upper flange 66 aids in the interface of the housing 18 thereto during the assembly of the telephone supporting device 10. As will be understood by those of ordinary skill in the art, the particular size and shape of the coupling member 60 is selected in accordance with the particular configuration of the console 16 on which the telephone supporting device 10 is to be mounted.

FIG. 6 is a perspective view showing the telephone supporting device 10 mounted to the raised upper edge portion 12 and lower edge portion 14 of the console 16. As shown in FIG. 6, the telephone supporting device 10 is mounted to the console 16 by first securing the coupling member 32 to the raised upper portion 12 and lower edge portion 14 of the console 16 in the aforementioned manner. The housing 18 is thereafter biased open to fit about the raised upper edge portion 12 and to permit the housing lip 30 to engage the first lower flange 42 of the coupling member 32. To remove the telephone supporting device 10, the housing exterior side portion 20 is flexed outwardly to permit disengagement between the lip 30 and first lower flange 42. Thereafter, the coupling member 32 may be separated from the upper edge portion 12 and lower edge portion 14 by loosening the fastening members 56 and removing the first member 34 and second member 36 from the upper edge portion 12 and lower edge portion 14. As such, no detergents or solvents are needed to remove any type of adhesive from the console surfaces and no permanent holes remain in the console 16 or underlying floor board.

What is claimed is:

1. A telephone supporting device detachably mounted to an automobile center console, the console having an upper edge portion, an exterior side portion, and a lower edge portion, the device comprising:

a housing for supporting a telephone, the housing being sized and configured for mounting upon the console and for supporting a telephone thereon, said housing having an engagement member formed on an inner surface thereof; and a coupling member releasably engageable to said console under the housing, said coupling member having an upper flange formed to receive the upper edge portion of the console, a first lower flange extending away from the exterior side portion of the console, and a second lower flange formed to receive the lower edge portion of the console, said first lower flange being releasably engageable to said housing engagement member to secure said housing to the console.

2. The telephone supporting device as recited in claim 1 wherein said coupling member comprises:
   a first member including said upper flange, a first substantially planar body portion and said first lower flange; and
   a second member releasably connectable to said first member, said second member including a second substantially planar body portion and said second lower flange.

3. The telephone supporting device as recited in claim 2 wherein said coupling member further comprises:
   a first pair of apertures disposed within said first body portion;
   a second pair of apertures disposed within said second body portion, said first pair of apertures and said second pair of apertures being in alignment when said first body portion is connected to said second body portion; and
   a pair of fastener members extendable into the aligned pairs of apertures, said fastener members being operative to secure said first and second body portions together.

4. The telephone supporting device as recited in claim 3 wherein said first member further includes a stepped portion defined within said first body portion, and said second member further includes an upper edge, said upper edge abutting against said stepped portion when said first pair of apertures are aligned with said second pair of apertures.

5. The telephone supporting device as recited in claim 1 wherein said coupling member further comprises an upwardly turned lip formed along the distal edge of said upper flange, said lip being sized and configured to aid in the engagement of said housing to said coupling member.

6. The telephone supporting device as recited in claim 5 wherein said coupling member comprises:
   a first member including said upper flange, a first substantially planar body portion and said first lower flange; and
   a second member rigidly connected to said first member via an adhesive, said second member including a second substantially planar body portion and said second lower flange.

7. The telephone supporting device as recited in claim 6 wherein said first member further includes a stepped portion defined within said first body portion, and said second member further includes an upper edge, said upper edge abutting against said stepped portion when said second member is rigidly secured to said first member.

8. The telephone supporting device as recited in claim 1 wherein said housing includes a housing interior side portion, a housing exterior side portion, said an upper surface for supporting a telephone thereon.

9. The telephone supporting device as recited in claim 8 wherein said housing further includes a lip disposed upon an inner surface of said housing exterior side portion, said lip being detachably engageable to said first lower flange.

10. The telephone supporting device as recited in claim 9 wherein said lip is an integral portion of the housing exterior side portion.

11. The telephone supporting device as recited in claim 8 wherein said housing interior and exterior side portions are normally biased toward each other, and are separable to extend about the console upper edge portion.

12. The telephone supporting device as recited in claim 8 wherein said housing further comprises a channel intermediate the housing interior and exterior side portions for receiving the console upper edge portion.

* * * * *